US012288509B2

(12) United States Patent
Jin (10) Patent No.: US 12,288,509 B2
(45) Date of Patent: Apr. 29, 2025

(54) SIGNAL GENERATION METHOD AND APPARATUS, AND CHIP (71) Applicant: QINGDAO XINHE XIAOXIN TECHNOLOGY CO., LTD, Qingdao (CN)

(72) Inventor: Yongyi Jin, Qingdao (CN)

(73) Assignee: QINGDAO XINHE XIAOXIN TECHNOLOGY CO., LTD, Qingdao (CN)

( * ) Notice: Subject to any disclaimer, the term of this patent is extended or adjusted under 35 U.S.C. 154(b) by 0 days.

(21) Appl. No.: 18/580,145

(22) PCT Filed: Jul. 21, 2022

(86) PCT No.: PCT/CN2022/106979
§ 371 (c)(1),
(2) Date: Jan. 17, 2024

(87) PCT Pub. No.: WO2023/005786
PCT Pub. Date: Feb. 2, 2023

(65) Prior Publication Data
US 2025/0037642 A1 Jan. 30, 2025

(30) Foreign Application Priority Data
Jul. 27, 2021 (CN) .......................... 202110852094.5

(51) Int. Cl.
*G09G 3/32* (2016.01)
*G06F 3/14* (2006.01)
(52) U.S. Cl.
CPC .............. *G09G 3/32* (2013.01); *G06F 3/1446* (2013.01); *G09G 2300/026* (2013.01); *G09G 2320/0626* (2013.01); *G09G 2340/0435* (2013.01)

(58) Field of Classification Search
CPC .............. G09G 3/32; G09G 2300/026; G09G 2320/0626; G09G 2340/0435; G06F 3/1446
See application file for complete search history.

(56) References Cited

U.S. PATENT DOCUMENTS

| 2017/0354795 A1 | 12/2017 | Blahnik et al. |
| 2019/0228202 A1* | 7/2019 | Chai ............ H05B 47/11 |

(Continued)

FOREIGN PATENT DOCUMENTS

| CN | 203289701 U | 11/2013 |
| CN | 203596951 U | 5/2014 |

(Continued)

OTHER PUBLICATIONS

ISA State Intellectual Property Office of the People's Republic of China, International Search Report and written opinion Issued in Application No. PCT/CN2022/106979 , Oct. 19, 2022, WIPO, 11 pages.

(Continued)

*Primary Examiner* — Roy P Rabindranath
(74) *Attorney, Agent, or Firm* — Kilpatrick Townsend & Stockton LLP (57) ABSTRACT A signal generation method and device, and a chip are provided. In the method, the target brightness for achieving the display effect can be obtained, and then a second display duration is determined according to a first display duration and the target brightness, to determine the duration that a target display unit needs to be in the ON state in a refresh cycle in order to achieve the display effect. Then, the second display duration can be allocated to the refresh cycle according to a control mode to obtain a target control signal.

15 Claims, 3 Drawing Sheets

(56) References Cited

U.S. PATENT DOCUMENTS

| | | | |
|---|---|---|---|
| 2021/0065608 A1 | 3/2021 | Zhai et al. | |
| 2021/0304673 A1* | 9/2021 | Gao | ............... G09G 3/3225 |
| 2022/0130308 A1* | 4/2022 | Jung | ............... G09G 5/00 |

FOREIGN PATENT DOCUMENTS

| | | |
|---|---|---|
| CN | 105744672 A | 7/2016 |
| CN | 106486052 A | 3/2017 |
| CN | 107517536 A | 12/2017 |
| CN | 105228297 B | 4/2018 |
| CN | 108399883 A | 8/2018 |
| CN | 108446013 A | 8/2018 |
| CN | 110473493 A | 11/2019 |
| CN | 110853573 A | 2/2020 |
| CN | 110880297 A | 3/2020 |
| CN | 211400410 U | 9/2020 |

OTHER PUBLICATIONS

ROHM Semiconductor, "LED Driver with 12C Compatible and 3-wire Serial Interface for 8x16 LEDs in Dot Matrix", Mar. 14, 2016, total 33 pages.

ABOV Semiconductor Co., Ltd., "MC2204 Chip datasheet", Version 1.00, FAE Team, Dec. 15, 2008, total 26 pages.

Titan Micro Electronics Co., Ltd., "TM1620B Chip datasheet", V2.1, Aug. 4, 2012, total 18 pages.

SIEMENSE Co., Ltd., "XQG65-WS12U5600W washing machine", SIEMENSE Product catalog, May 9, 2016, total 5 pages.

* cited by examiner

SIGNAL GENERATION METHOD AND APPARATUS, AND CHIP

This application is the national phase of International Patent Application No. PCT/CN2022/106979, titled "SIGNAL GENERATION METHOD AND APPARATUS, AND CHIP", filed on Jul. 21, 2022, which claims the priority to Chinese Patent Application No. 202110852094.5, titled "SIGNAL GENERATION METHOD AND APPARATUS, AND CHIP", filed on Jul. 27, 2021 with the China National Intellectual Property Administration (CNIPA), both of which are incorporated herein by reference in their entireties.

FIELD

The present disclosure relates to the field of display control, and in particular to a signal generation method and apparatus and a chip.

BACKGROUND

In display screens of electrical appliances or some large outdoor display screens, a display module may include multiple display units arranged sequentially. For example, the display module may include display units arranged in M rows and N columns (where M and N each represent a positive integer). Each of the display units may be turned on or off. The display unit, when being turned on, emits light. Therefore, the display units in the display module may be separately controlled to be turned on or off based on their positions, and the entire display module displays an image desirable for the user.

However, for the conventional method for controlling a display module, it is difficult to achieve complex display effects such as breathing display effect.

SUMMARY

In view of this, a signal generation method and a signal generation apparatus, and a chip are provided according to embodiments of the present disclosure, to provide a display solution for flexibly controlling multiple display units in a display module.

In one embodiment, a signal generation method is provided according to an embodiment of the present disclosure. The method is applied to generate a target control signal for a target display unit, the target control signal is used to control the target display unit to achieve a target display effect, the target display effect includes a breathing display effect, the target display unit is included in a display module, the display module includes display units arranged in m rows and n columns, at most one row of display units in the display module is in on-state at a time, m represents a positive integer, and n represents a positive integer greater than 1.

The method includes:
  acquiring a target brightness of the target display unit, where the target brightness is determined based on a display effect of the target display unit during a refresh cycle, a duration of the refresh cycle is determined based on a refresh rate of the display module, and the display effect of the target display unit during the refresh cycle is determined based on the target display effect;
  determining a first display duration, where the first display duration is a maximum duration for which the target display unit is allowed to be in the on state during the refresh cycle;
  determining a second display duration based on the first display duration and the target brightness, where the second display duration is a duration for which the target display unit is in the on state for achieving the display effect; and
  generating the target control signal based on the second display duration and a control mode, where the target control signal is used to control the target display unit to be in the on state for a duration equal to the second display duration within the refresh cycle.

In one embodiment, the control mode includes a single-round control mode, and the generating the target control signal based on the second display duration and a control mode includes:
  in response to the control mode being the single-round control mode, determining a target control time period based on a target row position, where the target row position indicates a row where the target display unit is located in the display module; and
  generating the target control signal based on the target control time period and the second display duration, where during the target control time period within the refresh cycle, a total duration for which the target control signal is set to a first value equals to the second display duration, and in a case that the target control signal is set to the first value, the target display unit is in the on state.

In one embodiment, the generating the target control signal based on the target control time period and the second display duration includes:
  determining at least one effective output time period based on the second display duration and a target encoding manner, where each of the at least one effective output time period is included in the target control time period, and the target encoding manner indicates a distribution rule of the at least one effective output time period in the target control time period; and
  generating the target control signal based on the at least one effective output time period, where the target control signal is set to the first value during each of the at least one effective output time period.

In one embodiment, the target control signal includes a first type of sub-signal and a second type of sub-signal,
  the second type of sub-signal is set to a second value during the target control time period, and
  in a case that the first type of sub-signal is set to the first value and the second type of sub-signal is set to the second value, the target display unit is in the on state.

In one embodiment, the control mode includes a multi-round control mode, and the generating the target control signal based on the second display duration and a control mode includes:
  in response to the control mode being the multi-round control mode, acquiring a total number of rounds, where the total number of rounds is number of rounds of cyclical displaying implemented by the display module during the refresh cycle, and during round of the cyclical displaying, each row of display units in the display module is turned on at most once;
  determining a target number of rounds based on the second display duration, the first display duration, and the total number of rounds, where a ratio of the second display duration to the first display duration is equal to a ratio of the target number of rounds to the total number of rounds; and generating the target control signal based on the target number of rounds, where the number of times that the target control signal is set to the first value during the refresh cycle equals to the target number of rounds, a total duration for which the target control signal is set to the first value during the refresh cycle equals to the second display duration, and in a case that the target control signal is set to the first value, the target control unit is in the on state.

In one embodiment, the method is performed by a first chip, and the acquiring a target brightness of the target display unit includes:

receiving the target brightness sent by a second chip, where the second chip is configured to determine the target brightness based on the display effect of the target display unit during the refresh cycle: or determining the target brightness based on the display effect of the target display unit during the refresh cycle.

In one embodiment, a display method is provided according to an embodiment of the present disclosure. The method is applied to generate a target control signal for a target display unit, the target control signal is used to control the target display unit to achieve a target display effect, the target display effect includes a breathing display effect, the target display unit is included in a display module, the display module includes display units arranged in m rows and n columns, at most one row of display units in the display module is in on-state at a time, m represents a positive integer, and n represents a positive integer greater than 1.

The method includes:

acquiring a second display duration, where the second display duration is a duration for which the target display unit is in the on state for achieving a display effect, the second display duration is determined based on a first display duration and a target brightness, the first display duration is a maximum duration for which the target display unit is allowed to be in the on state during a refresh cycle, the target brightness is determined based on the display effect of the target display unit during the refresh cycle, a duration of the refresh cycle is determined based on a refresh rate of the display module, and the display effect of the target display unit during the refresh cycle is determined based on the target display effect; and generating the target control signal based on the second display duration and a control mode, where the target control signal is used to control the target display unit to be in the on state for a duration equal to the second display duration within the refresh cycle.

In one embodiment, a signal generation apparatus is provided according to an embodiment of the present disclosure. The apparatus is configured to generate a target control signal for a target display unit, the target control signal is used to control the target display unit to achieve a target display effect, the target display effect includes a breathing display effect, the target display unit is included in a display module, the display module includes display units arranged in m rows and n columns, at most one row of display units in the display module is in on-state at a time, m represents a positive integer, and n represents a positive integer greater than 1.

The apparatus includes:

an acquiring unit, configured to acquire a target brightness of the target display unit, where the target brightness is determined based on a display effect of the target display unit during a refresh cycle, a duration of the refresh cycle is determined based on a refresh rate of the display module, and the display effect of the target display unit during the refresh cycle is determined based on the target display effect;

a first determining unit, configured to determine a first display duration, where the first display duration is a maximum duration for which the target display unit is allowed to be in the on state during the refresh cycle;

a second determining unit, configured to determine a second display duration based on the first display duration and the target brightness, where the second display duration is a duration for which the target display unit is in the on state for achieving the display effect; and a generating unit, configured to generate the target control signal based on the second display duration and a control mode, where the target control signal is used to control the target display unit to be in the on state for a duration equal to the second display duration within the refresh cycle.

In one embodiment, the control mode includes a single-round control mode, the generating unit is configured to, in response to the control mode being the single-round control mode, determine a target control time period based on a target row position, where the target row position indicates a row where the target display unit is located in the display module; and generate the target control signal based on the target control time period and the second display duration, where during the target control time period within the refresh cycle, a total duration for which the target control signal is set to a first value equals to the second display duration, and in a case that the target control signal is set to the first value, the target display unit is in the on state.

In one embodiment, the generating unit is configured to: determine at least one effective output time period based on the second display duration and a target encoding manner, where each of the at least one effective output time period is included in the target control time period, and the target encoding manner indicates a distribution rule of the at least one effective output time period in the target control time period; and generate the target control signal based on the at least one effective output time period, where the target control signal is set to the first value during each of the at least one effective output time period.

In one embodiment, the target control signal includes a first type of sub-signal and a second type of sub-signal, the second type of sub-signal is set to a second value during the target control time period, and in a case that the first type of sub-signal is set to the first value and the second type of sub-signal is set to the second value, the target display unit is in the on state.

In one embodiment, the control mode includes a multi-round control mode, the generating unit is configured to: in response to the control mode being the multi-round control mode, acquire a total number of rounds, where the total number of rounds is number of rounds of cyclical displaying implemented by the display module during the refresh cycle, and during each round of cyclical displaying, each row of display units in the display module is turned on at most once: determine a target number of rounds based on the second display duration, the first display duration, and the total number of rounds, where a ratio of the second display duration to the first display duration is equal to a ratio of the target number of rounds to the total number of rounds; and generate the target control signal based on the target number of rounds, where the number of times that the target control signal is set to the first value during the refresh cycle is the target number of rounds, a total duration for which the target control signal is set to the first value during the refresh cycle equals to the second display duration, and in a case that the target control signal is set to the first value, the target control unit is in the on state.

In one embodiment, the method is performed by a first chip, and the acquiring unit is configured to receive the target brightness sent by a second chip, where the second chip is configured to determine the target brightness based on the display effect of the target display unit during the refresh cycle: or determine the target brightness based on the display effect of the target display unit during the refresh cycle.

In one embodiment, a chip is provided according to an embodiment of the present disclosure. The chip includes an interface circuit and a processor. The interface circuit is configured to receive instructions and transmit the instructions to the processor. The processor is configured to execute the instructions received via the interface circuit, to perform the method described in the embodiments.

In one embodiment, the chip further includes a receiving module. The interface circuit is further configured to receive the target brightness sent by a second chip, and the second chip is configured to determine the target brightness based on the display effect of the target display unit during the refresh cycle.

In one embodiment, a device is further provided according to an embodiment of the present disclosure. The device includes a memory, a processor and a display module. The memory is configured to store instructions. The processor is configured to run the instructions stored in the memory, to cause the device to perform the signal generation method described in the embodiments. The display module includes a target display unit. The target display unit is configured to implement displaying based on the target control signal generated by the processor.

In one embodiment, a computer-readable storage medium is further provided according to an embodiment of the present disclosure. The computer-readable storage medium is used to store a computer program. The computer program is used to control a computer to perform the signal generation method described in the embodiments.

A signal generation method and apparatus and a chip are provided according to the embodiments of the present disclosure. In the process of performing the signal generation method, a target brightness for achieving a display effect is first acquired, a second display duration is determined based on a first display duration and the target brightness, for determining the duration for which the target display unit is to be in the on state during the refresh cycle to achieve the display effect. Next, the second display duration is allocated to the refresh cycle based on the control mode to obtain the target control signal. In this way, the display brightness of the target display unit can be flexibly adjusted by changing the duration for which the target display unit is in the on state during the single refresh cycle. Therefore, with the signal generation method according to the embodiments of the present disclosure, the control signal corresponding to every display unit in the display module is generated, and the brightness of the display unit can be flexibly adjusted during the refresh cycle, to achieve complex display effects such as the breathing display effect.

BRIEF DESCRIPTION OF THE DRAWINGS

In order to illustrate the embodiments of the present disclosure more clearly, drawings to be used in the embodiments are introduced simply hereinafter. It is apparent that the drawings described below show only some embodiments of the present disclosure.

FIG. 2-A is a schematic structural diagram of an application scenario according to an embodiment of the present disclosure;

FIG. 2-B is a schematic structural diagram of an application scenario according to another embodiment of the present disclosure:

DETAILED DESCRIPTION OF EMBODIMENTS

Hereinafter, a basic structure of the display module is introduced.

Figure 1:
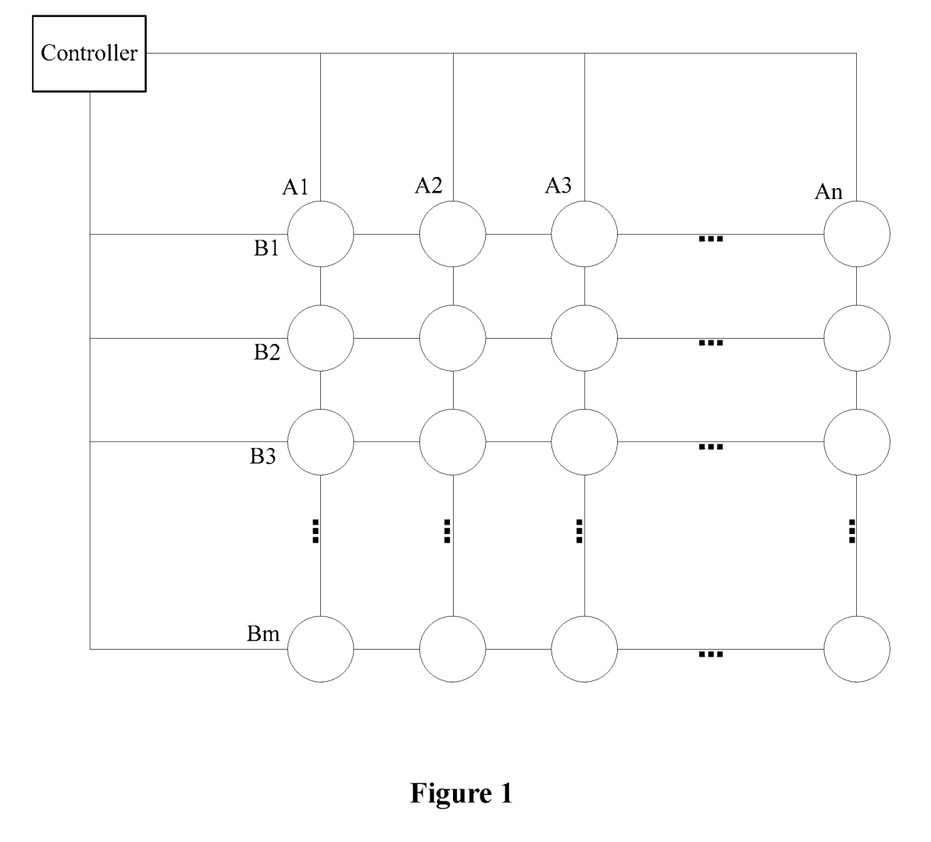
FIG. 1 is a schematic structural diagram of a display module according to an embodiment of the present disclosure.

Reference is made to FIG. 1, which is a schematic structural diagram of a display module. As shown in FIG. 1, the display module includes m*n display units (where m and n each represents a positive integer greater than or equal to 1) and a controller. The controller may output a total of m+n signals, including a signal A1, a signal A2, a signal A3 . . . a signal An, a signal B1, a signal B2, a signal B3 . . . and a signal Bm. Each of the display units has two input interfaces. When the two input interfaces are both input with signals corresponding to the on-state, the display unit is switched to be in the on state. In one embodiment, the display unit may be implemented by a light-emitting diode (LED). When the display unit is in the on state, the light-emitting diode emits light.

In order to facilitate control, the multiple display units in the display module may be controlled by a controller through scanning display. During a scanning display process, the controller may sequentially control rows of display units in the display module to be turned on or off row by row; and control remaining display units in the display module other than the display units in the current controlled row to maintain in an off state.

For example, assuming that a display unit arranged in an i-th row and a j-th column (where $1 \leq i \leq m$, $1 \leq j \leq n$) is referred to as a display unit Lij and the display unit is turned on when two input signals are both at a high level, then during the scanning display process, the controller may first output a high-level signal Bi, maintain a signal Bk ($1 \leq k \leq m$, $k \neq i$) at a low level, and adjust an output value of each of the signals A1 to An based on a display demand. After a preset time interval, the controller may adjust the signal Bi to be at a low level, adjust the signal Bi+1 to be at a high level, maintain the signal Bk ($1 \leq k \leq m$, $k \neq i+1$) at a low level, and adjust the output value of each of the signals A1 to An based on the display demand. Each row of display units in the display module can be turned on once in each round. In this way, users will see the continuous luminous display module if the preset time interval is small enough.

In an embodiment of the present disclosure, a change in the image displayed by the display module is referred to as a refresh (where a change in a local brightness or overall brightness of the image does not belong to refresh), and the shortest time period for allowing the image to change is referred to as a refresh cycle. Currently, a refresh rate of a device with the display module is mostly 60 Hz, corresponding to a refresh cycle of 16.66 milliseconds (ms). During the refresh cycle, a maximum duration for which a display unit is allowed to be in the on state is referred to as a first display duration. That is, the first display duration is a maximum duration for which the signals A1 to An are allowed to be at a high level (or a low level).

However, in the conventional method for controlling display units, the display units have fixed display states during a single refresh cycle. That is, during the refresh cycle, the display unit may be turned on for the first display duration or turned off throughout the refresh cycle. The controller fails to flexibly adjust the display durations of respective display units. Therefore, for the conventional method for controlling a display module, it is difficult to achieve complex display effects such as breathing display effect.

In order to address the above issues, a method and a signal generation apparatus, and a chip are provided according to embodiments of the present disclosure, to provide a display solution for flexibly controlling multiple display units in the display module. The signal generation method according to an embodiment of the present disclosure is described below in conjunction with the drawings in the specification. Apparently, the described embodiments are only some embodiments of the present disclosure, rather than all of the embodiments.

First of all, an application scenario of the signal generation method according to the embodiment of the present disclosure is introduced.

Figure 2A:
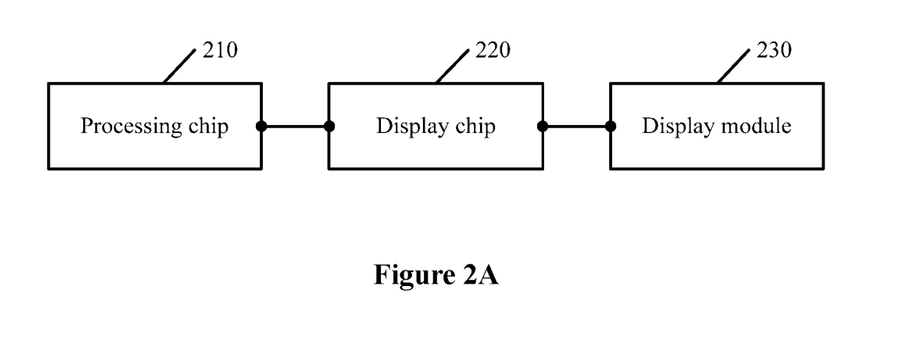

Reference is made to FIG. 2-A, which is a schematic structural diagram of an application scenario according to an embodiment of the present disclosure. In the application scenario shown in FIG. 2-A, a device includes a processing chip 210, a display chip 220, and a display module 230. The display chip 220 is connected to the processing chip 210 and the display module 230. The display module 230 includes m*n display units where n represents a positive integer greater than 1 and m represents a positive integer greater than or equal to 1.

In the embodiment of the present disclosure, the processing chip 210 and the display chip 220 each may be a processor, such as a central processing unit (CPU), or a module with data processing capability in the device, such as a single-chip microcontroller or a field programmable gate array (FPGA). The processing chip 210 is configured to determine a target brightness based on the display effect of a target display unit during the refresh cycle, and notify the target brightness to the display chip 220. The display chip 220 is configured to perform the signal generation method according to the embodiment of the present disclosure to generate a target control signal based on the target brightness, and send the target control signal to the display module 230, and the target display unit in the display module 230 implements displaying with the target brightness. In this way, the display module is controlled by an independent display chip, and the complexity of the processing chip can be reduced and the cost can be reduced.

In some possible embodiments, the device may include more than one display chip. The multiple display chips may be connected in series or parallel to the processing chip 210. The processing chip 210 may send the target brightness to each of the multiple display chips through a display chip directly connected to the processing chip 210, or send the target brightness to each of the multiple display chips separately through connections.

Figure 2B:
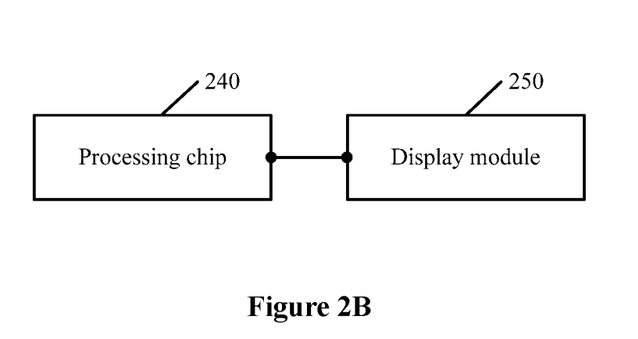

Reference is made to FIG. 2-B, which is a schematic structural diagram of an application scenario according to another embodiment of the present disclosure. In the application scenario shown in FIG. 2-B, the device includes a processing chip 240 and a display module 250. The processing chip 240 is connected to the display module 250. The display module 250 includes m*n display units, where n represents a positive integer greater than 1 and m represents a positive integer greater than or equal to 1.

In the embodiment shown in FIG. 2-B, the processing chip 240 is integrated with functions of the processing chip 210 and the display chip 220 shown in FIG. 2-A. That is, the processing chip 240 is configured to determine the target brightness, generate the target control signal based on the target brightness, and send the target control signal to the display module 250.

From the introduction for FIG. 1, it can be seen that the display module may have multiple control signals. In the embodiment of the present disclosure, the display chip 220 or the processing chip 240 may output m+n control signals, each of the control signals may be used to control display units arranged in one row or display units arranged in one column. In one embodiment, the display chip 220 or the processing chip 240 may output two control signals for controlling display units in multiple rows and display units in multiple columns, respectively. The output manner of the display chip 220 is not limited in the embodiment of the present disclosure. The display module 230 may be controlled through one control signal or multiple control signals.

By taking the embodiment shown in FIG. 2-A as an example, the signal generation method according to the embodiment of the present disclosure is introduced from the perspective of the display chip 220. It should be noted that the display chip 220 may include an interface circuit and a processor. The processor may execute instructions received via the interface circuit, to perform the signal generation method according to the embodiment of the present disclosure. In the method described below; the target control signal generated by the display chip may be used to control the target display unit in the display module. The control signals corresponding to the multiple display units in the display module can be generated with the signal generation method according to the embodiment of the present disclosure.

Figure 3:
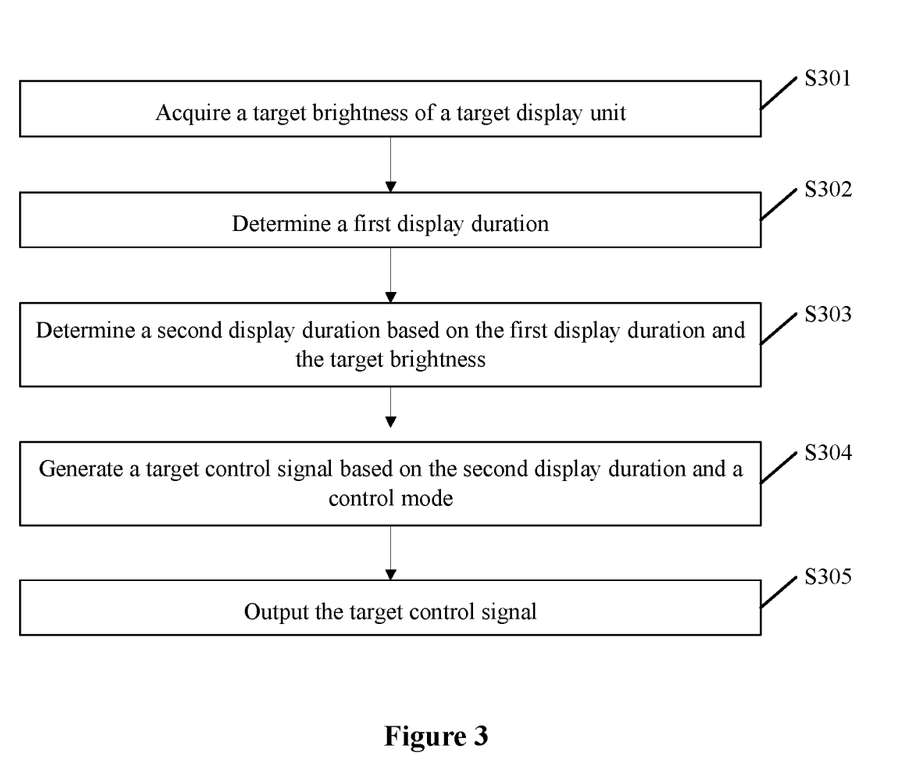
FIG. 3 is a flow chart of a signal generation method according to an embodiment of the present disclosure.

Reference is made to FIG. 3, which is a flow chart of a signal generation method according to an embodiment of the present disclosure. The method includes the following steps S301 to S305.

In step S301, the target brightness of the target display unit is acquired.

For generating the target control signal for controlling the target display unit, the display chip may first acquire the target brightness. The target brightness is determined based on the display effect of the target display unit during the refresh cycle. In other words, the target display unit is to achieve the target brightness for achieving the expected display effect during a next refresh cycle. For example, assuming that a current brightness is X and the target display unit is in a dimming process in a breathing display mode, the brightness of the target display unit during the next refresh cycle shall be less than X, for example, the brightness may be 0.8X. In one embodiment, the display chip may receive the target brightness from a control chip, or may calculate the target brightness. In the embodiment of the present disclosure, the display effect of the target display unit during the refresh cycle may be determined based on a target display effect. The target display effect refers to the display effect to be achieved by the target display unit during multiple refresh cycles, which is a display effect that can be viewed macroscopically by human eyes. In one embodiment, the target display effect may include a breathing display effect.

In a first possible implementation, the display chip may receive the target brightness sent from the control chip. For example, in the embodiment shown in FIG. 2-A, the control chip may pre-store a display solution for the display module, determine the target brightness of the target display unit based on the display solution and a position where the target display unit is located in the display module, and send the target brightness to the display chip 30) through the connection with the display chip. In one embodiment, the control chip may determine a display effect to be achieved during this refresh cycle based on the display solution and send the display effect to the display chip, and the display chip determines the target brightness based on the display effect.

In a second possible implementation, the display chip actively determines the target brightness based on the display demand. Display solutions may be generally referred to as the display demand. For example, the display demand may include a display demand of the breathing display effect. In one embodiment, the display chip may pre-configure one or more display solutions. The control chip may send a to-be-displayed image and a to-be-achieved display demand to the display chip. The display chip may determine the display effect based on the display solution and determine the target brightness of the target display unit based on the image and the display effect.

In step S302, a first display duration is determined.

In one embodiment, the display chip may determine the first display duration based on a duration of the refresh cycle and the number of rows of the display units in the display module. For example, assuming that the refresh cycle is 16.66 ms and the display module includes 10 rows of display units, each row of display units is allowed to be in the on state for a maximum duration of 1.66 ms during the scanning display process, that is, the first display duration of the target display unit is 1.66 ms.

In step S303, a second display duration is determined based on the first display duration and the target brightness.

After the first display duration and the target brightness are determined, the display chip may determine the second display duration based on the first display duration and the target brightness. The second display duration is a duration for which the target display unit is in the on state for achieving the display effect. That is, in order to achieve the display effect, the display chip keeps in the on state for a total of the second display duration during the next refresh cycle.

For example, it is assumed that the first display duration is 1.66 ms, and a maximum brightness of the target display unit is X during the scanning display process, and the target brightness is linearly related to the display duration. In order to control the target display unit to achieve a gradual dimming effect in the breathing display effect, the second display duration is determined as 1.66 ms during a first refresh cycle, the second display duration is determined as 1.33 ms during a second refresh cycle, and the second display duration is determined as 996 microseconds (μs) during a third refresh cycle. Similarly, the second display duration is 0 during a sixth refresh cycle. In this way, after five refresh cycles, the target display unit is changed from maximum brightness to the off-state, achieving the gradual dimming effect in the breathing display effect.

For purpose of description, illustration is made herein by referring to the case where the display effect, the target brightness, and the second display duration are linearly related to each other. In practical applications, the target brightness may be calculated from a complex correspondence based on the display effect, and there may be a complex mathematical relationship between the display effect and the target brightness.

In step S304, the target control signal is generated based on the second display duration and a control mode.

After determining the second display duration, the display chip may generate the target control signal based on the second display duration and the control mode. The target control signal is used to control the target display unit. The control mode represents the number of rounds run through by the display module during one refresh cycle, for example, the control mode may include a single-round control mode and a multi-round control mode.

As described above, during the scanning display process, rows of display units in the display module can implement displaying sequentially. A process that the rows of display units in the display module are sequentially turned on once for each of the rows is referred to as one round. That is, in one round, a row of display units in the display module can only be turned on once. In the embodiment of the present disclosure, one refresh may include one or more rounds. In a case that one refresh includes one round, the display chip is in the single-round control mode. In a case that one refresh includes multiple rounds, the display chip is in the multi-round control mode.

That is, in the single-round control mode, a row of display units can be uniformly turned on once during one refresh cycle. In the multi-round control mode, a row of display units can be uniformly turned on multiple times during one refresh cycle. For example, in the embodiment shown in FIG. 1, in the single-round control mode, the signal B1 has one high level during one refresh cycle, and a duration of the high level is the first display duration. In the multi-round control mode, the signal B1 has multiple high levels during one refresh cycle, and a sum of durations of the multiple high levels is the first display duration.

Hereinafter, a method for generating the target control signal in the single-round control mode, and a method for generating the target control signal in the multi-round control mode are described.

In a first possible implementation, the control mode is the single-round control mode, and the display chip may first determine a target control time period based on the position where the target display unit is located in the display module. In one embodiment, the display chip may determine the target control time period based on a target row position. The target row position indicates a row where the target display unit is located in the display module.

For example, in the embodiment as shown in FIG. 1, assuming that the rows of display units in the display module implement displaying in a top-to-bottom sequence in one round and the first display duration is 1.66 ms, then the target control time period corresponding to the first row of display units is from 0ms to 1.66 ms of the refresh cycle, the target control time period corresponding to the second row of display units is from 1.67 ms to 3.32 ms of the refresh cycle, and the target control time period corresponding to the third row of display units is from 3.33 ms to 4.98 ms of the refresh cycle.

After determining the target control time period, the display chip may generate the target control signal based on the target control time period and the second display duration. In one embodiment, when generating the target control signal, the display chip may set the target control signal to be a turning-off value in periods other than the target control time period and set the target control signal to be a first value in the target control time period, where a total duration for which the target control signal is set to the first value equals to the second display duration. In a case that the target control signal is set to the first value, the target display unit is in the on state. That is, the target control signal is set to the first value in the target control time period within the refresh cycle, and a total duration for which the target control signal is set to the first value equals to the second display duration.

As described above, the display units in the display module may be controlled by two control signals. Therefore, the generated target control signals may include a first type of sub-signals and a second type of sub-signals. The sub-signals of the first type are used to control multiple display units arranged in a column where the target display unit is located. The sub-signals of the second type are used to control multiple display units arranged in a row where the target display unit is located. The second type of sub-signal is set to a second value in the target control time period. In this way, in a case that the first type of sub-signal is set to the first value, the target display unit is in the on state.

For example, as shown in FIG. 1, the signal B2 is at a high level from 1.67 ms to 3.32 ms within the refresh cycle. In this way, the display units arranged in the second row in the display module can implement displaying under the control of respective column signals. A same first value or different first values may be used in the embodiment of the present disclosure. For example, in some possible implementations, the display unit Lij is turned on when a signal Aj is at a high level and the signal Bi is at a high level. In other possible implementations, the display unit Lij is turned on when the signal Aj is at a low level and the signal Bi is at a high level.

In the embodiment of the present disclosure, the display chip may set the target control signal to be the first value at the start (middle, end, or the like) of the target control time period, and change the value of the target control signal when the second display duration expires. In one embodiment, the display chip may adjust a duty cycle of the first type of sub-signal in such a way that the duration for which the first type of sub-signal is set to the first value equals to the second display duration during the target control time period. In one embodiment, the display chip may generate multiple pulse signals during the target control time period (assuming that the first value is at a high level), and a sum of durations of the multiple pulse signals equals to the second display duration. The multiple pulse signals may be evenly distributed within the target control time period, or randomly distributed within the target control time period.

A waveform of the target control signal during the target control time period is not limited in the embodiment of the present disclosure. In one embodiment, different waveforms of the target control signal during the target control time period may result in different second display durations in achieving a same target brightness. In some possible implementations, the display chip may further determine the second display duration based on the waveform of the target control signal.

In a second possible implementation, the control mode is the multi-round control mode. In the multi-round control mode, every row of display units has an equal maximum duration for implementing displaying in one round, and a brightness of each of the display units is constant in one round. Hence, the display effect can be achieved only by controlling the number of times that the target display unit is turned on. Therefore, the display chip may first determine a total number of rounds during the refresh cycle, determine a target number of rounds based on the total number of rounds, the first display duration, and the second display duration, and then determine a time period for which the target control signal is set to the first value based on the target number of rounds. The total number of rounds indicates the number of rounds run through by the display module during the refresh cycle.

The display chip may first calculate a ratio of the second display duration to the first display duration, and then the ratio is multiplied by the total number of rounds to obtain the target number of rounds. In this way, the ratio of the target number of rounds to the total number of rounds is equal to the ratio of the second display duration to the first display duration. The target control signal, generated based on the target number of rounds, is set to be the first value during the refresh cycle for the number of times equal to the target number of rounds and for a total duration equal to the second display duration. The distribution rule of the target number of rounds in the total number of rounds is not limited in the embodiment of the present disclosure.

Similar to the case of the single-round control mode, the target control signals may also include the first type of sub-signals and the second type of sub-signals. In the embodiment of the present disclosure, in a case that the control mode is the multi-round 20) control mode, the first type of sub-signals and the second type of sub-signals may be synchronously adjusted.

In the embodiment of the present disclosure, a change frequency of the target control signal may be higher than the refresh rate, namely the target control signal may be subjected to multiple level switches during one refresh cycle. In generating the target control signal, the display chip may generate the target control signal by using an interrupt source. The interrupt source may include an internal interrupt source and an external interrupt source. The internal interrupt source may include, for example, an on-chip timer interrupt. The external interrupt source may include, for example, an interrupt signal triggered by an external pin or other signals. In one embodiment, the display control method according to the embodiment of the present disclosure may be packaged as a program unit, and the program unit is inserted into a main program of the display control method. That is, the main program may determine a display image at every the refresh cycle. During the refresh cycle, the program unit may run once or multiple times. Each time the program unit runs, the target control signal for the target display unit in a current round may be generated by the program unit, to control the display effect of the display module during the refresh cycle.

In this way, the display chip may acquire a signal with the change frequency higher than the refresh rate by using the interrupt source or the program unit. Therefore, in generating the target control signal, the high-frequency signal generated by the interrupt source or the program unit may serve as a high-frequency signal source for generating the target control signal. For example, a high-frequency component may be provided in the target control signal. In one embodiment, the display chip may implement timing or counting based on the external interrupt source, continually determine whether the duration for which the target control signal is set to the first value equals to the second display duration, to ensure that the duration for which the target control signal is set to the first value equals to the second display duration. In this way, it is viewed by human eyes that the brightness displayed by the target display unit during the refresh cycle equals to the target brightness, achieving the display effect. Apparently, a higher frequency of signal generation by the interrupt source or the program unit is capable of achieving a finer display effect achieved by the target display unit.

In step S305, the target control signal is outputted.

With the method described above, the display chip may generate the target control signal for controlling the target display unit. In the embodiment of the present disclosure, the display chip may take each display unit in the display module as a target display unit and generate a target control signal for the display unit. After generating the target control signal, the display chip may output the target control signal to the display module, and each of the display units implements displaying to achieve the display effect.

In the signal generation method according to the embodiment of the present disclosure, the target brightness for achieving the display effect is first acquired, the second display duration is determined based on the first display duration and the target brightness, for determining the duration for which the target display unit is to be in the on state during the refresh cycle to achieve the display effect. Next, the second display duration is allocated to the refresh cycle based on the control mode to obtain the target control signal. In this way, the display brightness of the target display unit can be flexibly adjusted by changing the duration for which the target display unit is in the on state during the single refresh cycle. Therefore, with the signal generation method according to the embodiments of the present disclosure, the control signal corresponding to every display unit in the display module is generated, and the brightness of the display unit can be flexibly adjusted during the refresh cycle, to achieve complex display effects such as the breathing display effect.

In addition, a display method is further provided according to an embodiment of the present disclosure. In the display method, a control chip may determine a target brightness based on a target display effect, and then determine a second display duration and send the second display duration to a display chip. On receipt of the second display duration, the display chip may generate a target control signal for controlling a target display unit by using an external interrupt source or an internal interrupt source. Details may be referred to the foregoing descriptions, which are not repeated herein.

The above illustrates some specific implementations of the signal generation method according to the embodiments of the present disclosure. On this basis, an apparatus corresponding to the method is further provided according to the present disclosure. Hereinafter, the apparatus for signal generation according to an embodiment of the present disclosure is described from the perspective of functional modularization.

Figure 4:
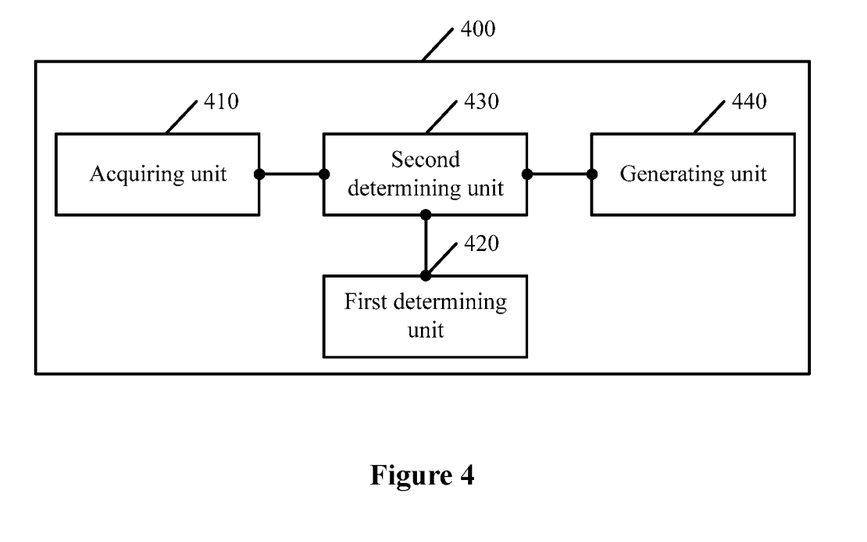
FIG. 4 is a schematic structural diagram of a signal generation apparatus according to an embodiment of the present disclosure.

Reference is made to FIG. 4, which is a schematic structural diagram of a signal generation apparatus. The apparatus 400 for signal generation includes an acquiring unit 410, a first determining unit 420, a second determining unit 430, and a generating unit 440.

The acquiring unit 410 is configured to acquire a target brightness of the target display unit. The target brightness is determined based on a display effect of the target display unit during a refresh cycle, and a duration of the refresh cycle is determined based on a refresh rate of the display module.

The first determining unit 420 is configured to determine a first display duration. The first display duration is a maximum duration for which the target display unit is allowed to be in the on state during the refresh cycle.

The second determining unit 430 is configured to determine a second display duration based on the first display duration and the target brightness. The second display duration is a duration for which the target display unit is in the on state for achieving the display effect.

The generating unit 440 is configured to generate the target control signal based on the second display duration and a control mode. The target control signal is used to control the target display unit to be in the on state for a duration equal to the second display duration within the refresh cycle.

In some possible implementations, the control mode includes a single-round control mode, and the generating unit 440 is configured to,
  in response to the control mode being the single-round control mode, determine a target control time period based on a target row position, where the target row position indicates a row where the target display unit is located in the display module; and
  generate the target control signal based on the target control time period and the second display duration, where during the target control time period within the refresh cycle, a total duration for which the target control signal is set to a first value equals to the second display duration, and in a case that the target control signal is set to the first value, the target display unit is in the on state.

In one embodiment, in some possible implementations, the generating unit 440 is configured to:
  for generating the target control signal based on the target control time period and the second display duration,
  determine at least one effective output time period based on the second display duration and a target encoding manner, where each of the at least one effective output time period is included in the target control time period, and the target encoding manner indicates a distribution rule of the at least one effective output time period in the target control time period; and
  generate the target control signal based on the at least one effective output time period, where the target control signal is set to the first value during each of the at least one effective output time period.

In one embodiment, in some possible implementations, the target control signal includes a first type of sub-signal and a second type of sub-signal, the second type of sub-signal is set to a second value during the target control time period, and in a case that the first type of sub-signal is set to the first value and the second type of sub-signal is set to the second value, the target display unit is in the on state.

In one embodiment, in some possible implementations, the control mode includes a multi-round control mode, the generating unit 440 is configured to:
  in response to the control mode being the multi-round control mode, acquire a total number of rounds, where the total number of rounds is number of rounds of cyclical displaying implemented by the display module during the refresh cycle, and during each round of the cyclical displaying, each row of display units in the display module is turned on at most once;

determine a target number of rounds based on the second display duration, the first display duration, and the total number of rounds, where a ratio of the second display duration to the first display duration is equal to a ratio of the target number of rounds to the total number of rounds; and generate the target control signal based on the target number of rounds, where the number of times that the target control signal is set to the first value during the refresh cycle is the target number of rounds, a total duration for which the target control signal is set to the first value during the refresh cycle equals to the second display duration, and in a case that the target control signal is set to the first value, the target control unit is in the on state.

In one embodiment, in some possible implementations, the method is performed by a first chip, and the acquiring unit 410 is configured to:

receive the target brightness sent by a second chip, where the second chip is configured to determine the target brightness based on the display effect of the target display unit during the refresh cycle: or determine the target brightness based on the display effect of the target display unit during the refresh cycle.

The expressions "first", "second" (if any) and similar variant described in the embodiments of the present disclosure are used only for distinguish different names, rather than indicating the first or the second in a sequence.

From the above embodiments, all or a part of steps in the method according to the above embodiments may be implemented by means of software and a general hardware platform. Based on such understanding, embodiments of the present disclosure may be embodied as a software product. The computer software product may be stored in a storage medium, such as a read-only memory (ROM)/RAM, a magnetic disc, or an optical disk, and the computer software product includes multiple instructions for enabling a computer device (which may be a personal computer, a server, or a network communication device such as a router), a single-chip microcontroller, a field programmable gate array (FPGA), or the like to perform the method described in various embodiments or some parts of the embodiments of the present disclosure.

The embodiments in this specification are described in a progressive manner, the same and similar parts between various embodiments may be referred to each other, and each of the embodiments focuses on the differences from other embodiments. Since the embodiments of the apparatus are basically similar to the embodiments of the method, the description thereof is relatively simple, and for relevant matters, reference is made to the description of the embodiments of the method. Some or all of the modules may be selected according to actual needs to achieve the embodiments of the disclosure.

The foregoing descriptions are only exemplary embodiments of the present disclosure but are not intended to limit the protection scope of the present disclosure.

The invention claimed is:

1. A signal generation method, applied to generate a target control signal for a target display unit, wherein the target control signal is used to control the target display unit to achieve a target display effect, the target display effect comprises a breathing display effect, the target display unit is provided in a display module, the display module comprises display units arranged in m rows and n columns, at most one row of the display units in the display module is in as on state at a time, m represents a positive integer, and n represents a positive integer greater than 1, wherein the method comprises:

acquiring a target brightness of the target display unit, wherein the target brightness is determined based on a display effect of the target display unit during a refresh cycle, a duration of the refresh cycle is determined based on a refresh rate of the display module, and the display effect of the target display unit during the refresh cycle is determined based on the target display effect;

determining a first display duration, wherein the first display duration is a maximum duration for which the target display unit is allowed to be in the on state during the refresh cycle;

determining a second display duration based on the first display duration and the target brightness, wherein the second display duration is a duration for which the target display unit is in the on state for achieving the display effect; and generating the target control signal based on the second display duration and a control mode, wherein the target control signal is used to control the target display unit to be in the on state for a duration equal to the second display duration within the refresh cycle.

2. The method according to claim 1, wherein
the control mode comprises a single-round control mode, and the generating the target control signal based on the second display duration and the control mode comprises:

in response to the control mode being the single-round control mode, determining a target control time period based on a target row position, wherein the target row position indicates a row where the target display unit is located in the display module; and generating the target control signal based on the target control time period and the second display duration, wherein during the target control time period in the refresh cycle, a total duration for which the target control signal is set to a first value equals to the second display duration, and in a case that the target control signal is set to the first value, the target display unit is in the on state.

3. The method according to claim 2, wherein the generating the target control signal based on the target control time period and the second display duration comprises:

determining at least one effective output time period based on the second display duration and a target encoding manner, wherein each of the at least one effective output time periods is comprised in the target control time period, and the target encoding manner indicates a distribution rule of the at least one effective output time period in the target control time period; and generating the target control signal based on the at least one effective output time period, wherein the target control signal is set to the first value during each of the at least one effective output time period.

4. The method according to claim 3, wherein the target control signal comprises a first type of sub-signal and a second type of sub-signal, the second type of sub-signal is set to a second value during the target control time period, and in a case that the first type of sub-signal is set to the first value and the second type of sub-signal is set to the second value, the target display unit is in the on state.

5. The method according to claim 1, wherein the control mode comprises a multi-round control mode, and the generating the target control signal based on the second display duration and the control mode comprises:

in response to the control mode being the multi-round control mode, acquiring a total number of rounds, wherein the total number of rounds is number of rounds of cyclical displaying implemented by the display module during the refresh cycle, and during each round of the cyclical displaying, each row of display units in the display module is turned on at most once;

determining a target number of rounds based on the second display duration, the first display duration, and the total number of rounds, wherein a ratio of the second display duration to the first display duration is equal to a ratio of the target number of rounds to the total number of rounds; and generating the target control signal based on the target number of rounds, wherein the number of times that the target control signal is set to the first value during the refresh cycle equals to the target number of rounds, a total duration for which the target control signal is set to the first value during the refresh cycle equals to the second display duration, and in a case that the target control signal is set to the first value, the target control unit is in the on state.

6. The method according to claim 1, wherein the method is performed by a first chip, and the acquiring the target brightness of the target display unit comprises:

receiving the target brightness sent by a second chip, wherein the second chip is configured to determine the target brightness based on the display effect of the target display unit during the refresh cycle; or determining the target brightness based on the display effect of the target display unit during the refresh cycle.

7. A device comprising a display module and a display control module, wherein the display control module is configured to perform the signal generation method according to claim 1, and output a generated target control signal to the display module; and the display module comprises a target display unit, wherein the target display unit is configured to implement displaying based on the target control signal.

8. A chip comprising an interface circuit and a processor, wherein the interface circuit is configured to receive instructions and transmit the instructions to the processor; and the processor is configured to execute the instructions received via the interface circuit, to generate a target control signal for a target display unit, wherein the target control signal is used to control the target display unit to achieve a target display effect, the target display effect comprises a breathing display effect, the target display unit is provided in a display module, the display module comprises display units arranged in m rows and n columns, at most one row of the display units in the display module is in as state at a time, m represents a positive integer, and n represents a positive integer greater than 1, the processor is configured to perform:

acquiring a target brightness of the target display unit, wherein the target brightness is determined based on a display effect of the target display unit during a refresh cycle, a duration of the refresh cycle is determined based on a refresh rate of the display module, and the display effect of the target display unit during the refresh cycle is determined based on the target display effect;

determining a first display duration, wherein the first display duration is a maximum duration for which the target display unit is allowed to be in the on state during the refresh cycle;

determining a second display duration based on the first display duration and the target brightness, wherein the second display duration is a duration for which the target display unit is in the on state for achieving the display effect; and generating the target control signal based on the second display duration and a control mode, wherein the target control signal is used to control the target display unit to be in the on state for a duration equal to the second display duration within the refresh cycle.

9. The chip according to claim 8, further comprising a receiving module, wherein the interface circuit is further configured to receive the target brightness sent by a second chip, and the second chip is configured to determine the target brightness based on the display effect of the target display unit during the refresh cycle.

10. The chip according to claim 8, wherein the control mode comprises a single-round control mode, and the processor is further configured to perform:

in response to the control mode being the single-round control mode, determining a target control time period based on a target row position, wherein the target row position indicates a row where the target display unit is located in the display module; and generating the target control signal based on the target control time period and the second display duration, wherein during the target control time period in the refresh cycle, a total duration for which the target control signal is set to a first value equals to the second display duration, and in a case that the target control signal is set to the first value, the target display unit is in the on state.

11. The chip according to claim 10, wherein the processor is further configured to perform:

determining at least one effective output time period based on the second display duration and a target encoding manner, wherein each of the at least one effective output time periods is comprised in the target control time periods, and the target encoding manner indicates a distribution of the at least one effective output time period in the target control time period; and generating the target control signal based on the at least one effective output time period, wherein the target control signal is set to the first value during each of the at least one effective output time period.

12. The chip according to claim 11, wherein the target control signal comprises a first type of sub-signal and a second type of sub-signal, the second type of sub-signal is set to a second value during the target control time period, and in a case that the first type of sub-signal is set to the first value and the second type of sub-signal is set to the second value, the target display unit is in the on state.

13. The chip according to claim 8, wherein the control mode comprises a multi-round control mode, and the processor is further configured to perform:

in response to the control mode being the multi-round control mode, acquiring a total number of rounds, wherein the total number of rounds is number of rounds of cyclical displaying implemented by the display module during the refresh cycle, and during each round of the cyclical displaying, each row of display units in the display module is turned on at most once;

determining a target number of rounds based on the second display duration, the first display duration, and the total number of rounds, wherein a ratio of the second display duration to the first display duration is equal to a ratio of the target number of rounds to the total number of rounds; and generating the target control signal based on the target number of rounds, wherein number of times that the target control signal is set to the first value during the refresh cycle equals to the target number of rounds, a total duration for which the target control signal is set to the first value during the refresh cycle equals to the second display duration, and in a case that the target control signal is set to the first value, the target control unit is in the on state.

14. The chip according to claim 8, wherein the processor is further configured to perform:

receiving the target brightness sent by a second chip, wherein the second chip is configured to determine the target brightness based on the display effect of the target display unit during the refresh cycle; or determining the target brightness based on the display effect of the target display unit during the refresh cycle.

15. A display method applied to generate a target control signal for a target display unit, wherein the target control signal is used to control the target display unit to achieve a target display effect, the target display effect comprises a breathing display effect, the target display unit is provided in a display module, the display module comprises display units arranged in m rows and n columns, at most one row of the display units in the display module is in as on-state at a time, m represents a positive integer, and n represents a positive integer greater than 1, wherein the method comprises:

acquiring a second display duration, wherein the second display duration is a duration for which the target display unit is in the on state for achieving a display effect, the second display duration is determined based on a first display duration and a target brightness, the first display duration is a maximum duration for which the target display unit is allowed to be in the on state during a refresh cycle, the target brightness is determined based on the display effect of the target display unit during the refresh cycle, a duration of the refresh cycle is determined based on a refresh rate of the display module, and the display effect of the target display unit during the refresh cycle is determined based on the target display effect; and generating the target control signal based on the second display duration and a control mode, wherein the target control signal is used to control the target display unit to be in the on state for a duration equal to the second display duration within the refresh cycle.

* * * * *